United States Patent
Davenport et al.

(10) Patent No.: US 12,515,822 B1
(45) Date of Patent: Jan. 6, 2026

(54) SATELLITE THERMAL TRANSPORT SYSTEM FOR EARTH-FACING COMPONENTS

(71) Applicant: Lockheed Martin Corporation, Bethesda, MD (US)

(72) Inventors: Andrew Arthur Davenport, Englewood, CO (US); Jay H. Ambrose, Santa Cruz, CA (US); Matthew Henry Rosenbrock, Livermore, CA (US); Neil Evan Goodzeit, Devon, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 353 days.

(21) Appl. No.: 17/477,759

(22) Filed: Sep. 17, 2021

(51) Int. Cl.
*B64G 1/50* (2006.01)
*F28D 15/04* (2006.01)
*F28D 15/02* (2006.01)

(52) U.S. Cl.
CPC ............ *B64G 1/506* (2013.01); *B64G 1/503* (2013.01); *F28D 15/0241* (2013.01); *F28D 15/04* (2013.01)

(58) Field of Classification Search
CPC .......... B64G 1/506; B64G 1/503; B64G 1/10; B64G 1/50; F28D 15/0241; F28D 15/04
See application file for complete search history.

(56) References Cited

U.S. PATENT DOCUMENTS

| | | | |
|---|---|---|---|
| 7,513,462 B1* | 4/2009 | McKinnon | B64G 1/503 244/173.1 |
| 8,714,492 B2 | 5/2014 | Goodzeit et al. | |
| 8,960,608 B2 | 2/2015 | Goodzeit et al. | |
| 8,967,547 B2* | 3/2015 | Wong | B64G 1/506 244/172.6 |
| 9,315,280 B2 | 4/2016 | Ambrose et al. | |
| 9,352,855 B2* | 5/2016 | Wong | B64G 1/44 |
| 10,538,345 B2 | 1/2020 | Ambrose et al. | |
| 2003/0121639 A1* | 7/2003 | Nomura | F28D 15/0275 165/41 |
| 2008/0143636 A1* | 6/2008 | Couchman | H04B 7/18515 343/915 |
| 2013/0200221 A1* | 8/2013 | Goodzeit | B64G 1/58 29/890.03 |
| 2017/0355474 A1* | 12/2017 | Busche | B64G 1/643 |
| 2021/0318074 A1* | 10/2021 | McKinnon | B64G 1/506 |
| 2023/0234724 A1* | 7/2023 | Boccio | B64G 1/50 244/172.7 |

* cited by examiner

*Primary Examiner* — Gordon A Jones

(57) ABSTRACT

Provided herein are various enhancements for thermal regulation systems of satellites. In one example, a satellite includes an assembly comprising a main panel having at least one component having a power dissipation property, and side panels generally perpendicular to the main panel and rotatably coupled to radiator panels deployable outward from the side panels. The satellite also includes a thermal network comprising heat pipes at least partially embedded in the main panel configured to accept thermal energy from the component and transport the thermal energy to the side panels for further transport to the radiator panels and radiation by the radiator panels when deployed.

15 Claims, 10 Drawing Sheets

SATELLITE THERMAL TRANSPORT SYSTEM FOR EARTH-FACING COMPONENTS

TECHNICAL BACKGROUND

Electrically Steerable Arrays (ESAs) have been increasingly employed on satellites, in part because of the ability to dynamically define beam coverage and capacity for space-based communications. ESAs and accompanying communication systems can dissipate a significant portion of their input electrical power as heat, and require low operating temperatures to provide the desired performance and reliability. Heat generated during operation in space can cause thermal problems for ESAs and other satellite components, and so thermal radiators can be employed to radiate at least a portion of the heat into space. However, this heat can be difficult to radiate from the earth-facing side of the satellite when a direct-radiating ESA operates in geosynchronous orbit (GEO). For missions where multiple launches or multiple satellites-per-launch vehicle are required, such as swarm or constellation missions, launch vehicle payload constraints can force reductions in individual satellite sizes, further packaging heat-generating components into smaller volumes with less available thermal radiator surface areas.

Heat pipe networks have been employed that transport heat generated by components of a satellite to thermal radiator features. Flexible heat pipe structures have also been employed, such as discussed in U.S. Pat. Nos. 9,315,280 and 10,538,345. Heat pipes form conduits carrying a working fluid that can transfer heat away from hot components to radiator features using two phase heat transfer arrangements. However, when ESAs are employed, the ESA thermal dissipation and temperature requirements are often far different than those of other satellite electronics, e.g., payload digital processors. This can create thermal regulation problems for temperature control elements of the satellites and may drive even larger sizes for thermal radiator components. Moreover, satellite manufacturing and integration can be very complex when the component panels of a satellite share an integrated thermal regulation system with associated heat pipes.

OVERVIEW

Thermal control of orbital satellites can be challenging, especially when earth-facing components are employed, such as Electrically Steerable Arrays (ESAs). Some examples herein employ direct-radiating and earth-facing ESAs which do not rely on reflectors, such as parabolic elements or dish elements, to transmit or receive radio frequency (RF) energy with respect to the earth. The use of direct-radiating, earth-facing ESAs can expose temperature-sensitive transmit/receive components to constant direct sun illumination, especially when deployed to a Geosynchronous Orbit (GEO), and such ESAs experience both internal heat dissipation and solar irradiance. To provide thermal regulation of ESAs and other on-board components and electronics, various enhanced implementations are provided. Heat pipe networks are employed that receive heat from ESA components, transport the heat using a working fluid to radiator elements which then emit corresponding thermal energy into space. The examples herein employ various enhanced multi-modular arrangements that transport heat from earth-facing direct-radiating ESAs to north (N) and south(S) facing radiator panels while providing independent thermal networks for other satellite components. Advantageously, this multi-modular approach allows for ESAs to be thermally regulated to a target temperature while other electrical components can be thermally regulated to different temperatures. Moreover, manufacturing and integration is enhanced by providing for discrete modules that can be independently built and tested before assembly into a complete satellite.

In one example implementation, a satellite includes an assembly comprising a main panel having at least one component (such as a direct-radiating radio frequency array), and side panels generally perpendicular to the main panel and rotatably coupled to radiator panels deployable outward from the side panels. The satellite also includes a thermal network comprising heat pipes at least partially embedded in the main panel configured to accept thermal energy from the component and transport the thermal energy to the side panels for further transport to the radiator panels when deployed. The satellite can also include a second assembly thermally incongruent from the assembly and having a thermal network configured to regulate a temperature of at least one additional component to a different temperature than the component of the assembly.

Another example implementation includes a satellite having a thermal handling system. The thermal handling system includes a first set of heat pipes configured to accept thermal energy produced by a component (such as a direct-radiating radio frequency array) mounted to an earth-facing panel of a satellite, and a second set of heat pipes configured to accept the thermal energy from the first set of heat pipes and transfer the thermal energy over a set of flexible heat pipes to thermal radiator panels of the satellite. The thermal radiator panels are configured to deploy from a stowed east-west configuration into a deployed north-south configuration and maintain a target operating temperature for the component. The satellite can also include a third set of heat pipes independent from the first set of heat pipes and the second set of heat pipes and configured to accept further thermal energy produced by an additional component mounted to a north-south panel and maintain a different operating temperature for the electrical component than the target operating temperature.

In another example implementation, a method includes receiving thermal energy produced by a component into a first set of heat pipes mounted to an earth-facing panel of a satellite, and receiving the thermal energy from the first set of heat pipes into a second set of heat pipes mounted to east-west facing panels. The method includes transporting the thermal energy from the second set of heat pipes over flexible heat pipes coupled to radiator panels of the satellite, and dissipating of at least a portion of the thermal energy by radiation from the radiator panels to maintain a target operating temperature for the component, where the radiator panels are configured to deploy from a stowed east-west configuration into a deployed north-south configuration.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Presented herein are enhanced thermal transport and regulation systems, techniques, and arrangements for satellites that may employ high power-dissipating elements on earth-facing panels, such as Electrically Steerable Arrays (ESAs). ESAs provide flexibility to dynamically allocate coverage and capacity using an array of elements to receive or transmit signals. However, ESAs typically have a higher thermal dissipation and require lower operating temperatures than other radio frequency (RF) systems and other electrical components, such as on-board computers, sensors, or station-keeping elements. Some satellites include reflector-fed ESAs that employ directional reflectors or parabolic dish elements. These reflector-fed ESAs are not as compact in volume or as suitable for large apertures as direct-radiating ESA systems. Direct-radiating ESAs do not rely on reflectors, such as parabolic elements or dish elements, to transmit or receive RF energy with respect to distant communication nodes. When direct-radiating ESAs are included on satellites that are primarily earth-facing (such as when in GEO), on-board thermal dissipation as well as solar illumination can create high operating temperatures for ESAs and associated electrical components that can reduce RF performance and reliability. Moreover, when many satellites are employed in swarm or constellation configurations, the use of multiple satellites per-launch is desired. The enhanced satellites discussed herein employ direct-radiating ESAs with thermal control systems that are well suited to multi-device missions and GEO swarms for communication applications.

Figure 1:
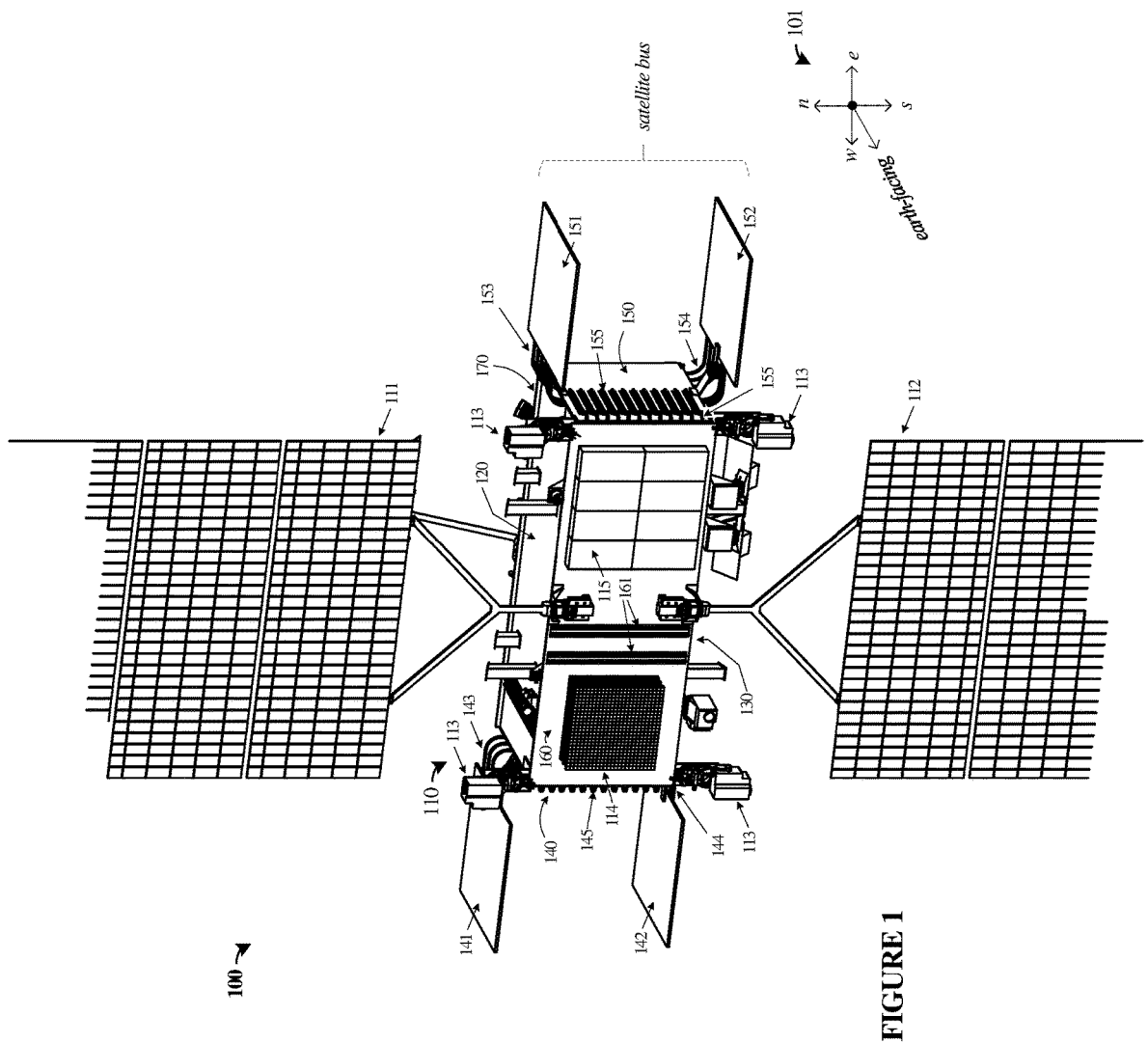
FIG. 1 illustrates a satellite in an implementation.

Directionality of various components in the included Figures is discussed in relation to an orbited body, such as Earth or other celestial body. Example axis representation 101 is shown in FIG. 1 having an earth-facing direction which represents a direction 'inward' towards the central body. Other directions include north, south, west, and east. In orbital spacecraft parlance, these various terms are often used when referring to directionality relative to a central body. When in geosynchronous orbit, one side of the spacecraft will typically remain as facing the earth and can be referred to as earth-facing. An east-west direction refers to an axis perpendicular to the earth-facing one and generally parallel to the equatorial plane for a GEO satellite. Accordingly, a north-south direction is perpendicular to the earth-facing axis and parallel to the earth pole vector for a GEO satellite.

Thus, all axes can be defined for a spacecraft in orbit relative to the central body, and the terms earth-facing, north-south, and east-west will be employed herein.

As a first example implementation, FIG. 1 is presented. FIG. 1 illustrates satellite 110 in deployed configuration 100. This deployed configuration has deployed solar arrays 111-112 (partially hidden from view) and deployed radiator panels 141-142 and 151-152. Radiator panels 141-142 and 151-152 comprise a portion of a thermal control system (TCS) or thermal network included on satellite 110 which encompasses several other modular portions or panels of satellite 110. Radiator panels 141-142 and 151-152 can be referred to as deployable radiator assemblies (DRAs). Satellite 110 also includes electrically steerable arrays (ESAs) 114-115 on main panel 160 as example components which dissipate electrical/RF power.

Main panel 160, in this example, comprises an earth-facing panel configured to generally face earth in orbit. Main panel 160 is coupled to side panels 140 and 150. Side panels 140 and 150 each are rotatably coupled to radiator panels 141-142 and 151-152. Panel 120 and panel 130 are also included, but in this example comprise modules having an independent or incongruent thermal network from the thermal network formed using panels 140, 150, 160, and radiator panels 141-142 and 151-152.

Other components of satellite 110 include the previously mentioned solar arrays 111-112, along with optical communication elements 113. Optical communication elements 113 (four included in FIG. 1) provide for inter-satellite communications using laser-modulated communication links or other suitable optical communication configurations. Further electronics or electrical components can be included on satellite 110 and provide command and data handling, propulsion, attitude control, power control, and other various functions. Some of these further electronics might be housed on panels 120 and 130. Panel 160 can include various components having power dissipation properties, such as RF components, electronics, and communication equipment related to operating ESAs 114-115, transmitters, receivers, power amplifiers, modulators, filters, multiplexers, array control systems, polarizers, and other various components.

A heat pipe network is included on at least panels 140, 150, and 160, as well as radiator panels 141-142 and 151-152. Heat pipes form conduits that use a working fluid in thermal contact with electrical/RF components to transport thermal energy away from these components. The heat dissipated is absorbed by the working fluid through walls of the heat pipes which causes a phase change in the working fluid, such as from a liquid phase to a gas/vapor phase. The vapor transports the thermal energy along the length of the heat pipes to a relatively cold portion of the heat pipes and then condenses back into the liquid phase, which releases latent heat. This transported thermal energy can be emitted or otherwise radiated by radiator panels 141-142 and 151-152. The liquid can then be returned to the portion of the heat pipes proximate to the hot components to repeat the cycle. The liquid can be returned using various techniques, such as capillary action, centrifugal force, pumping systems, or other processes.

While various example details of heat pipe networks are discussed in the Figures below, some high-level features are included in FIG. 1. Panel 160 includes heat pipes that are at least partially embedded within panel 160, and cross-strap elements 161 are shown which thermally interconnect at least some of the heat pipes of panel 160. Cross-strap elements 161 can provide reduction in thermal gradients among the embedded heat pipes, such as to balance temperature differences among the heat pipes in panel 160 when certain ones of the heat pipes encounter hotter or cooler portions of the associated electronics or ESAs. From here, the heat pipes form bent portions 145 and 155 to side panels 140 and 150. Side panels 140 and 150 include heat pipes which thermally couple to flexible heat pipe sections 143-144 and 153-154 and that further connect to heat pipes in radiator panels 141-142 and 151-152.

In operation, heat pipes on main panel 160 receive heat from at least ESAs 114-115 and transport the heat using a working fluid for delivery to radiator panels 141-142 and 151-152 by way of side panels 140 and 150. Radiator panels 141-142 and 151-152 then emit corresponding thermal energy into space which has the ultimate effect of removing heat from ESAs 114-115. The examples herein employ various enhanced multi-modular arrangements that transport heat from earth-facing direct-radiating ESAs to non-earth-facing radiator panels while providing separate thermal networks for other on-board components which reside on other panels with independent thermal networks. Advantageously, this multi-modular approach allows for ESAs to be thermally regulated to a target temperature while other electrical components on the independent thermal networks can be thermally regulated to different temperatures. Moreover, manufacturing and integration is enhanced by providing for discrete modules that can be independently built and tested before assembly into a complete satellite.

Figure 2:
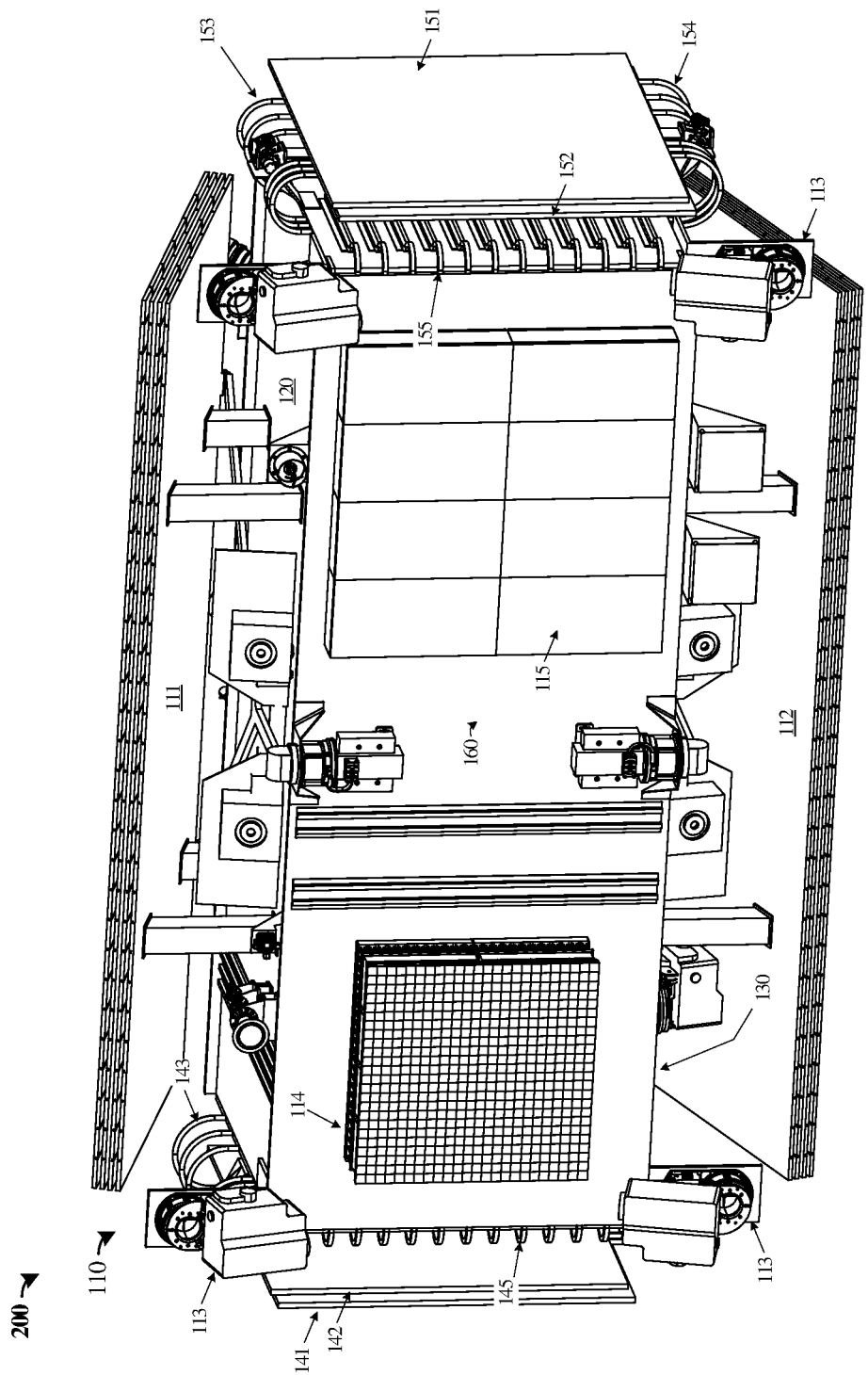
FIG. 2 illustrates a satellite in a stowed configuration in an implementation.

Using the directionality terms noted above, satellite 110 has an earth-facing panel (main panel 160), a west-facing panel (side panel 140), an east-facing panel (side panel 150), north-facing radiator panels (141, 151), south-facing radiator panels (142, 152), north-facing panel 120, and south-facing panel 130. A different quantity of panels can be employed, such as a smaller quantity of radiator panels depending on ESA thermal dissipation and temperature control requirements. Before deployment, radiator panels 141-142 and 151-152, are held in a stowed configuration. FIG. 2 shows this stowed configuration 200, which includes a nested configuration, where one radiator panel is stowed on top of the other one. Thus, the radiator panels will have an east-west facing arrangement during stowage, similar to that of the side panels. When deployed, radiator panels 141-142 and 151-152 are rotated to be generally parallel to north panel 120 and south panel 130, generally perpendicular to side panels 140 and 150, and also generally perpendicular to main panel 160. Generally perpendicular refers to radiator panels being positioned in a range of approximately +/−30 degrees of perpendicular to the to the east and west panels. The radiator deployment angle is shown as 90 degrees from side panels 140 and 150 in many of the examples herein, but could be as little as 60 degrees or as much as 120 degrees, with an optimum for heat rejection typically around 120 degrees. However, the 90-degree angle may be preferred for some examples due to satellite physical constraints. The use of deployable radiator panels reduces spacecraft size and volume in the stowed configuration, and also facilitates packaging for launching swarm or constellation missions when using a single launch vehicle fairing to encase many such devices.

Satellite 110 also includes solar arrays 111-112 that stow against north panel 120 and south panel 130 (as seen in FIG. 2). In the stowed position, solar arrays 111-112 are elevated off north panel 120 and south panel 130 and tilted to make space for boom-mounted components such as Hall Current Thrusters (HCTs) or other attitude control, propulsion, communication, and sensor components. Deployment of radiator panels 141-142 and 151-152 as well as solar panels 111-112 can be achieved using various techniques, including with hinges that exert deployment torques. The hinges are sized to exert torques sufficient to overcome the residual stiffness of the flexible heat pipes in the deployed orientation. The radiator panels may be restrained using split-spool release devices (SSRDs) or other suitable components that when actuated release the panels. Other equipment can be employed for panel deployment, such as motors, cabling, boom extenders, strain energy deployment elements, spring-loaded elements, or other suitable components.

As noted above, satellite 110 includes one or more ESAs, such as a transmit (Tx) ESA 114 and a receive (Rx) ESA 115. The ESAs may operate in Ka-band or X-band, among other RF frequency bands, with each ESA composed of multiple RF elements or subarrays. Various ESA support components are included in the various discussions on ESAs 114-115, such as amplifiers, splitters, multiplexers, filters, modulators, demodulators, array control systems, transmitters, receivers, and such, can be included on main panel 160, but are omitted in FIG. 1 for clarity. The example ESAs 114-115 on satellite 110 can have various levels of power dissipation during operation, which may vary based on activity levels. However, during maximum operating conditions, a typical heat dissipation into main panel 160 for both ESAs 114-115 (and supporting components) is approximately 1700 watts (W). In one configuration, ESA 114 dissipates up to 700 W, and ESA 115 dissipates up to 1000 W. To achieve target RF performance, the ESAs and associated components mounted to main panel 160 are desired to be maintained at a temperature below 35° C. The ESA heat dissipation cannot be effectively rejected using the earth-facing panel alone. Moreover, other electrical or RF components on the north panel 120 or south panel 130 can generate additional heat and have different temperature requirements than that of main panel 160. Thus, the examples herein employ deployable radiator panels oriented to face north-south directions. Also, a subassembly is included in satellite 160 which transports and radiates heat independently of north-south panels 120 and 130, allowing for better thermal control of ESA components.

Figure 3:
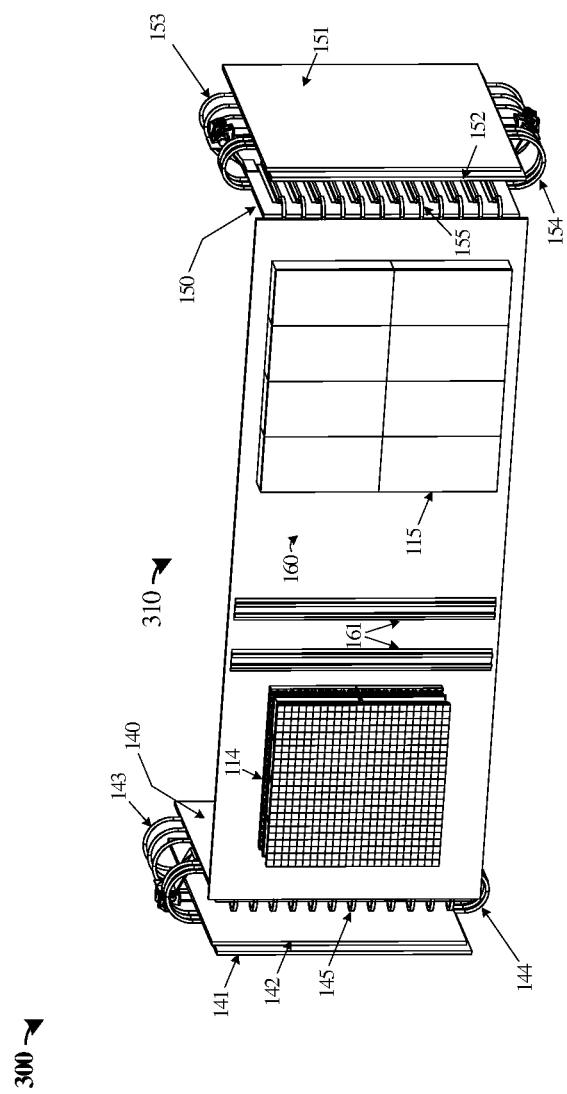
FIG. 3 illustrates a stowed satellite panel configuration in an implementation.

FIG. 3 shows stowed configuration 300 of assembly 310 forming a thermal control system or thermal network with heat pipes embedded into associated panels. Assembly 310 forms a portion of satellite 110 from FIG. 1. Similar elements are shown in FIG. 3 as found in FIGS. 1 and 2, but it should be understood that other configurations and elements are possible. As seen in FIG. 3, ESAs 114-115 each are coupled to an earth-facing side of main panel 160. ESAs 114-115 also couple thermally to heat pipes which are embedded or partially embedded within main panel 160. Other features of assembly 310 are also shown in FIG. 3, namely cross-strap elements 161, side panels 140 and 150, and radiator panels 141-142 and 151-152. Various bent or flexible heat pipes couple the panels together to form assembly 310, such as bent heat pipes 145 and 155 and flexible heat pipe sections 143-144 and 153-154. In stowed configuration 300, radiator panels 141-142 and 151-152 are stacked parallel to corresponding side panels 140 and 150. This stowed configuration can be employed during launch, deployment from a launch vehicle, and positioning into a desired orbital location. Afterwards, deployment of radiator panels 141-142 and 151-152 can occur, which is discussed in FIG. 4.

Figure 4:
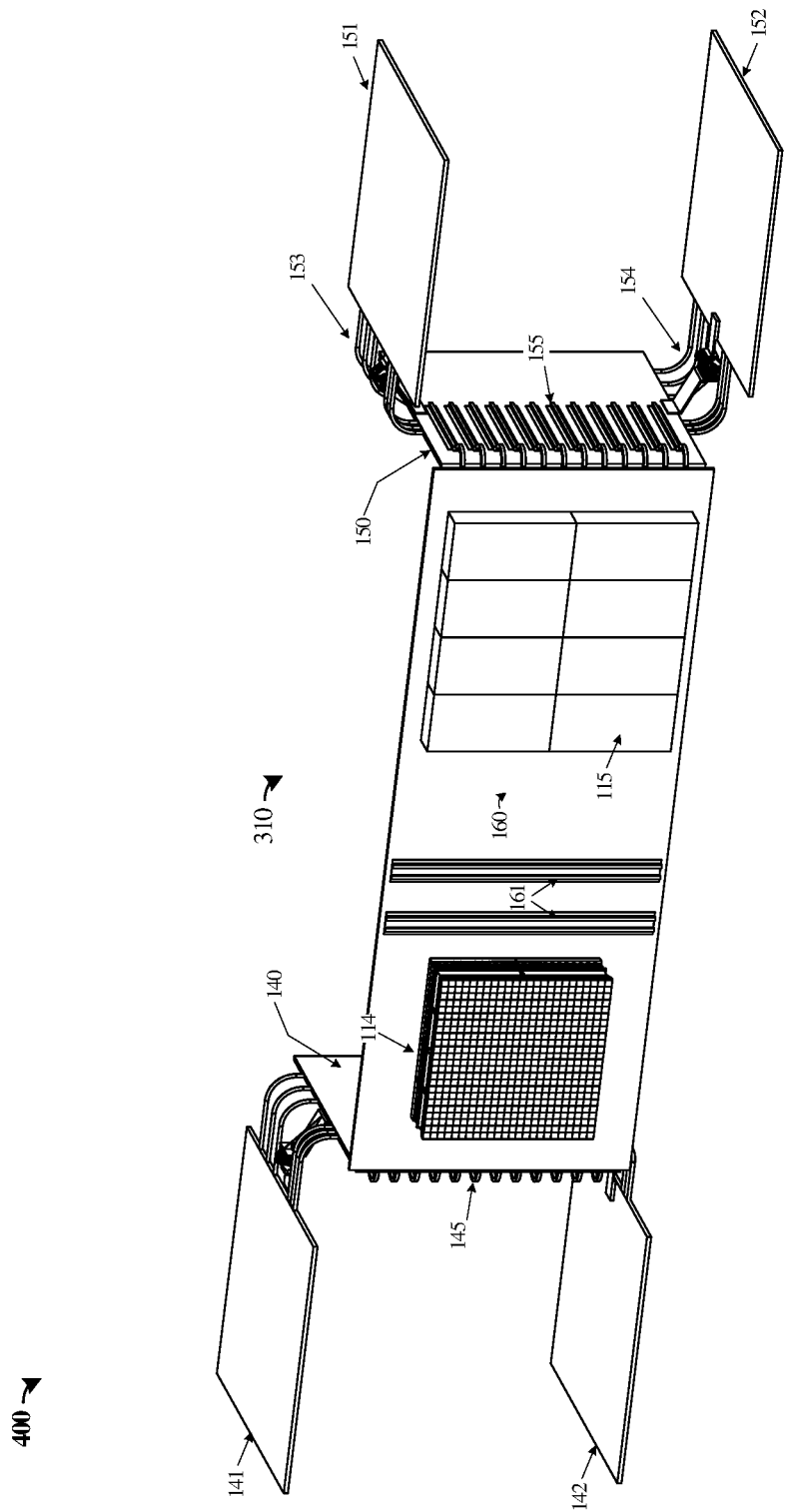
FIG. 4 illustrates a deployed satellite panel configuration in an implementation.

FIG. 4 shows deployed configuration 400 of assembly 310 having a thermal network or heat pipe network with associated panels. Assembly 310 forms a portion of satellite 110 from FIG. 1. Similar elements are shown in FIG. 4 as found in FIGS. 1-3, but it should be understood that other configurations and elements are possible. As seen in FIG. 4, ESAs 114-115 each are coupled to an earth-facing side of main panel 160. ESAs 114-115 also couple thermally to heat pipes which are embedded or partially embedded within main panel 160. Other features of assembly 310 are also shown in FIG. 3, namely cross-strap elements 161, side panels 140 and 150, and radiator panels 141-142 and 151-152. Various bent or flexible heat pipes couple the panels together to form assembly 310, such as bent heat pipes 145 and 155 and flexible heat pipe sections 143-144 and 153-154. In deployed configuration 400, radiator panels 141-142 and 151-152 are rotated outward from the stowed configuration to be generally perpendicular to corresponding side panels 140 and 150.

Assembly 310 comprises an independent subsystem of satellite 110 that accommodates ESAs 114-115 and may be built and tested separately from other portions of satellite 110. A thermal network includes parallel heat pipes embedded in the earth-facing main panel 160 that transport heat from ESAs 114-115 to side panels 140 and 150 (east/west) of satellite 110. This thermal network then interfaces to further heat pipes that transport heat to four deployed radiators panels 141-142 and 151-152. In the configurations shown, two radiator panels are positioned on an east side of satellite 110 and two on a west side of satellite 110. The thermal coupling of ESAs 114-115 to both the east and west sides of satellite 110 reduces the operating temperatures of the ESAs to meet a target temperature. Assembly 310 allows high power electrical/RF components to be mounted on an earth-facing deck, which is not well suited as a thermal radiator given the direct solar exposure and large diurnal temperature swing. Heat is routed using the thermal network to side panels 140 and 150 and radiators panels 141-142 and 151-152 to reject heat into space with low solar exposure. While side panels 140 and 150 receive direct sun for a portion of an orbit (assuming GEO), the thermal coupling of the opposing radiators panels 141-142 and 151-152 balances this heat load and keeps the diurnal swing of the ESAs to low levels, approximately 8° C. in this implementation. Also, the ESA assembly can be operated at a different temperature than the N and S panels. With assembly 310 electrical/RF component peak temperatures are maintained approximately 16° C. cooler, with a peak prediction of 21° C. compared to 37° C. for north and south panels that has an independent thermal system (pictured in FIG. 5).

Figure 5:
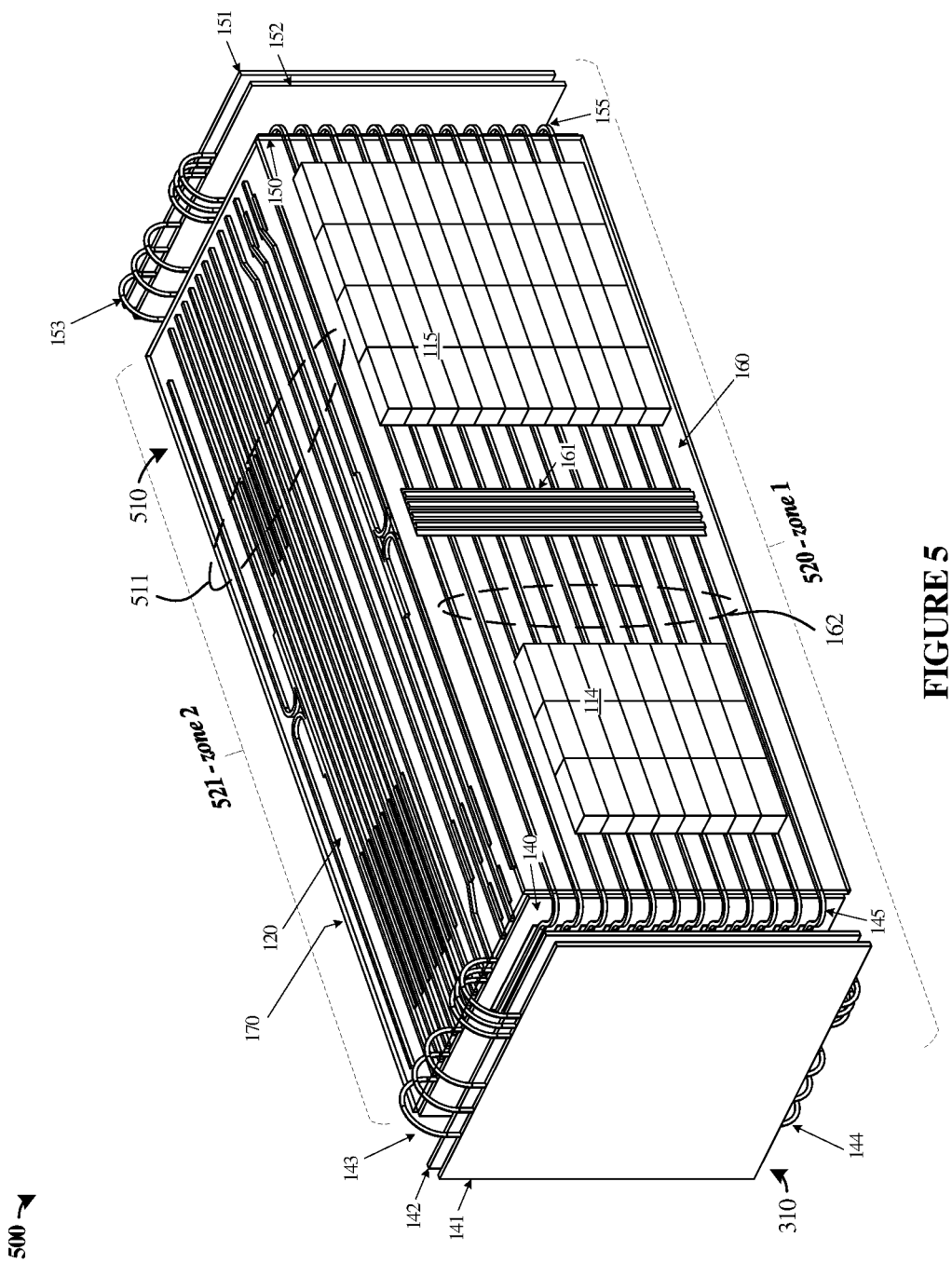
FIG. 5 illustrates a satellite panel configuration in an implementation.

FIG. 5 illustrates configuration 500 having assembly 310 from FIGS. 3-4 which forms a first thermal control zone (zone 1-520) and assembly 510 which forms a second thermal control zone (zone 2-521). Assembly 310 is in a stowed configuration with radiator panels 141-142 and 151-152 stored/stacked parallel to side panels 140 and 150. Also shown in FIG. 5 is a system of heat pipes which are at least partially embedded into panels that form a satellite. Each zone has a corresponding set of parallel heat pipes which transport thermal energy (heat) away from heat-dissipating elements. Assembly 510 is thermally independent or incongruent from assembly 310, and thus components located on assembly 510 can be regulated to a different temperature than components located on assembly 310.

Assembly 510 includes north-facing panel 120 which can house various electrical components that are included on a corresponding satellite. The components can include those associated with satellite bus subsystems, the communications payload, or other payloads. Generally parallel heat pipes 511 are thermally-coupled to these components and receive thermal energy that is spread across the panel and radiated to space.

Assembly 310 also includes a set of generally parallel heat pipes 162. Heat pipes 162 are thermally-coupled to electrical/RF components of panel 160. As seen in FIG. 5, these components of assembly 310 can include ESAs 114-115, among other components attached to the interior side of the panel not shown for clarity. Heat pipes 162 receive thermal energy for transport away from the electrical/RF components and to the outer east-west edges of panel 160. At these edges, bent portions 145 and 155 couple heat pipes 162 to heat pipes associated with side panels 140 and 150. Side panels 140 and 150 include heat pipes (hidden from view) which transport the thermal energy received from panel 160 in a perpendicular direction to reach north-south edges of side panels 140 and 150. From here, flexible heat pipe sections 143-144 and 153-154 carry the thermal energy to radiator panels 141-142 and 151-152. Radiator panels 141-142 and 151-152 then radiate or otherwise dissipate the thermal energy into space when deployed into a generally north-south facing orientation.

Figure 6:
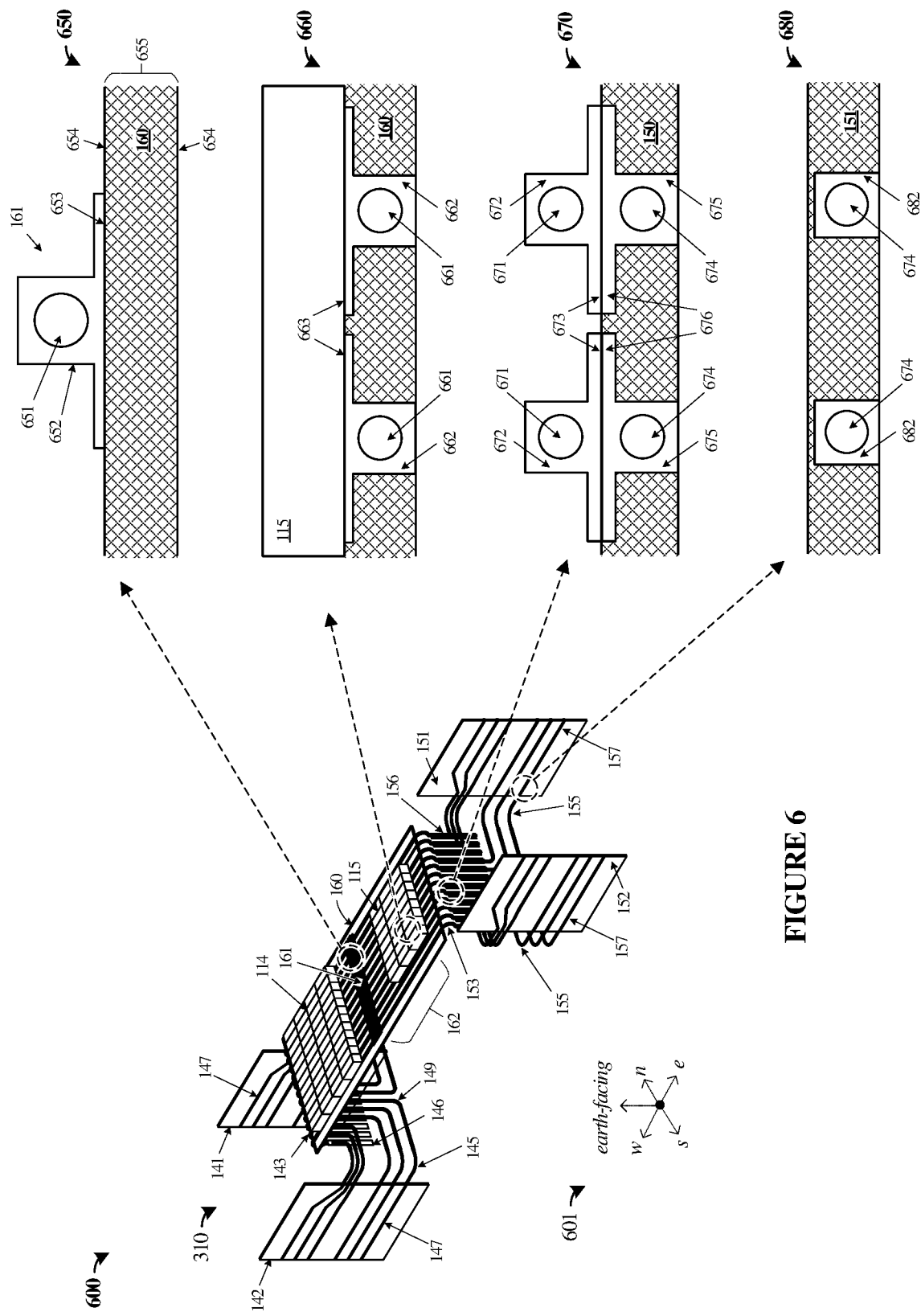
FIG. 6 illustrates details of a heat pipe implementation for a satellite panel configuration in an implementation.

FIG. 6 deployed configuration 600 having assembly 310 from FIGS. 3-4 showing a heat pipe network including that of radiator panels 141-142 and 151-152 and cross-sectional views 650, 660, 670, and 680 of heat pipes for associated panels. Assembly 510 is omitted in FIG. 6 to better illustrate the heat pipe features of assembly 310. Similar features may be found in assembly 510, albeit forming a thermally-decoupled set of panels and heat pipe network. Assembly 310 is in a deployed configuration with radiator panels 141-142 and 151-152 deployed outward with regard to side panels 140 and 150. Since configuration 600 shows assembly 310 rotated from the view shown in FIG. 5, a rotated axis representation 601 is included in FIG. 6. Rotated axis representation 601 has an earth-facing direction which represents a direction 'inward' towards the central body, which is 'up' on the page in this example. Other directions are labeled that include north, south, west, and east.

Turning first to the heat pipes of main panel 160, cross-sectional views 650 and 660 are included. View 650 shows cross-strap elements 161 in detail. In view 650, heat pipe 651 formed by member 652 having flange 653, which is then attached to main panel 160. Cross-strap elements 161 is formed from a heat pipe arrangement on main panel 160. Cross-strap elements 161 can be employed across the earth-facing main panel 160 deck to balance heat loads and reduce temperature gradients due to both component asymmetries and solar heating environment asymmetries which are experienced by the generally parallel heat pipes embedded in main panel 160. This balancing of thermal gradients is achieved by thermally interconnecting at least a portion of the parallel heat pipes embedded within main panel 160. The thermal interconnection can be formed using conduction of heat from the embedded heat pipes to the perpendicular cross-strapping heat pipes without direct interconnection of the working fluid. Other examples might have a series of apertures which can interconnect the working fluid directly. Flanges of each heat pipe member, such as flange 653, can provide additional surface area for thermal coupling among heat pipes and to receive heat from an associated panel or component. Moreover, thermal adhesive or gaskets can be applied between the flanges and the face sheet of main panel 160, which may be aluminum or some other material. More than one such arrangement as shown in view 650 can be employed depending upon the desired amount of reduction in thermal gradients between parallel heat pipes of main panel 160.

Main panel 160 also includes heat pipes embedded therein. These heat pipes comprise several parallel heat pipes that run the length of main panel 160. View 660 shows example embedded heat pipes 661 which are formed by members 662 and embedded in material 655 of main panel 160, which may be aluminum honeycomb or some other material. This material 655 of main panel 160 is encased or sandwiched between panel face sheets 654, and other panels have similar features. Also seen in view 660 is ESA 115, which dissipates heat that is received into a working fluid of heat pipes 661. Flange portions 663 of members 662 conduct heat from ESA 115 into the body of members 662 and the working fluid contained in heat pipes 661. Thermal adhesive or gaskets can be applied between flanges 663 and the material that forms main panel 160.

The parallel heat pipes that are embedded within main panel 160 then are routed to side panels 140 and 150 using corresponding bent sections 143 and 153. The bent sections allow the heat pipes of main panel 160 to take a static/fixed 90-degree turn to reach side panels 140 and 150. Various stress-relief shapes or bend radii can be employed during the 90-degree bend, but the bent sections are fixed in orientation and configuration once formed during manufacturing. From here, further heat pipes embedded within side panels 140 and 150 are thermally coupled to the terminal ends of the bent sections of main panel 160. View 670 shows this interface, and this overlay interface is shown as elements 146 and 156 in FIG. 6. In view 670, heat pipes 671 formed from members 672 and flanges 673 originate from main panel 160. These heat pipes 671 are positioned close in proximity for thermal conduction of thermal energy into heat pipes 674 embedded in side panels 140 and 150. Heat pipes 674 are formed from members 675 and flanges 676 which thermally couple to flanges 673. Thermal adhesive or gaskets can be applied between flanges 673, flanges 676, and the material that forms side panels 140 and 150. The length of interfacing between heat pipes 671 and heat pipes 674 can vary based on application, ESA thermal dissipation, target temperatures, available radiator area and other factors.

Heat pipes 674 embedded within side panels 140 and 150 comprise flexible heat pipes. These flexible heat pipes have bent sections which are embedded within the material of side panels 140 and 150. The bent sections embedded in the side panels typically do not change in configuration or orientation once manufactured to be embedded in the panel. However, once the flexible heat pipes exit the material of side panels 140 and 150, the flexible heat pipes allow for flexing or rotatable bending that can accommodate deployment of radiator panels 141-142 and 151-152 from stowage near side panels 140 and 150. This dynamically flexible section of the flexible heat pipes is indicated as elements 145 and 155 in FIG. 6. From here, the flexible heat pipes are embedded in the material of radiator panels 141-142 and 151-152 and noted as elements 147 and 157 in FIG. 6. The heat pipes in radiator panels 141-142 and 151-152 might be spread out for uniform engagement with the panel-achieving a consistent pitch to maximize heat rejection. View 680 shows the continuation of heat pipes 674 from the side panels into the radiator panels. A different member or flange arrangement can be employed for the portion of the flexible heat pipes in the radiator panels, as noted for elements 682. Various loopback features might be included in the heat pipes in radiator panels 141-142 and 151-152 to provide for circulation of the working fluid of the heat pipes. Although other examples might have termination features instead of loopback features.

Thus, the arrangement of heat pipes shown in FIG. 6 provides for transfer of thermal energy received from ESAs 114-115 to radiator panels 141-142 and 151-152 and subsequent emission into space. This arrangement reduces the operating temperatures of ESAs 114-115, and can be employed to provide a target operating temperature to ESAs 114-115. The use of flexible heat pipes within side panels 140 and 150 that couple to radiator panels 141-142 and 151-152 provides for a deployable configuration of radiator panels 141-142 and 151-152. The flexible sections of heat pipes 674 can dynamically bend during rotation of the radiator panels outward with respect to the side panels, all while maintaining thermal conduits between the side panels and radiator panels. This configuration allows for earth-facing high-power dissipation elements to operate at a target temperature while dissipating the heat in a generally north-south direction instead of trying to radiate thermal energy in an earth-facing or east-west direction.

Figure 7:
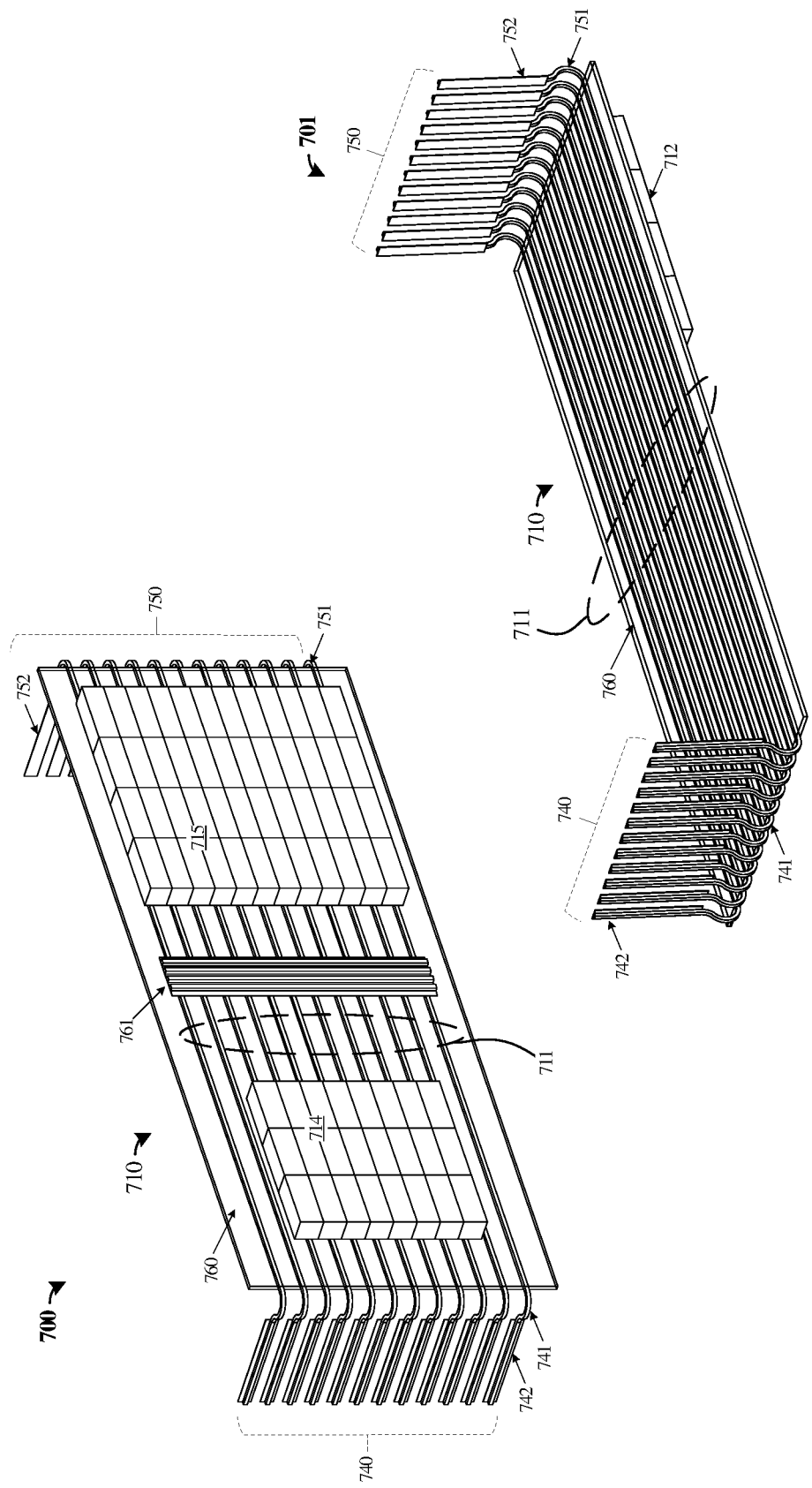
FIG. 7 illustrates details of a heat pipe network for a satellite panel configuration in an implementation.

Other configurations than those shown in FIG. 6 can be employed. The flexible heat pipes (674) may be external to side panels 140 and 150 rather than embedded to allow for a direct connection to the heat pipes of main panel 160 (671). Also, while view 670 shows a parallel interfacing between heat pipes 671 and heat pipes 674, an alternative perpendicular approach can be employed. This perpendicular approach can be similar to that employed for cross-strap elements 161. In this example, a perpendicular interface has heat pipes 671 extending the full length of side panels 140 and 150. The flexible heat pipes (675) would then comprise a dual condenser configuration with a common design between all pipes. This has the benefit of allowing an end-to-end thermal balance test to be performed in a reflux orientation (i.e. main panel facing downward on a test fixture), as seen in FIG. 7. An alternate thermal balance test configuration creates a planar Earth deck (no 90 degree bends) and all heat pipes would be in-plane.

The panels which comprise satellite 110 (e.g. elements 120, 130, 140, 150, 160, and 170) can comprise various thicknesses and internal/face material compositions. Weight optimizations can be done to adjust any corresponding heat pipe pitch vs. panel face sheet thicknesses on the radiator panels and/or main panel. Typically, honeycomb material will be employed as the internal material that forms the panels, with panel face sheets sandwiching the honeycomb material. Machined panels can be used instead of honeycomb panels. Example material comprising the honeycomb or machined panels includes aluminum 5056 honeycomb core with aluminum 7075-T73 face sheets. Other various metals, alloys, composites, or other suitable materials can be employed for the honeycomb or machined features. The various panels can have surface coatings, such as paints or other external treatments. For example, main panel 160 can be covered with germanium Kapton Multi-Layer Insulation (MLI) to limit solar heat loading to the main panel 160. Side panels 140 and 150 are largely covered with optical solar reflector (OSR) tiles to maximize heat rejection and the non-embedded (exposed) sections of heat pipes 661, shown as elements 143 and 153, are painted with Z93 white paint. The south faces of the radiator panels 141-142 and 151-152 are covered with OSR tiles, while the north faces use Z93 white paint. This implementation performs a seasonal 180° yaw flip of the corresponding satellite to keep the north faces of the satellite in the shade. White paint has a higher emissivity than the OSR tiles and is used for the north faces to maximize heat rejection. Alternatively, both sides of the radiator panels can be covered with OSR tiles for the case where the satellite does not perform a seasonal yaw flip.

The heat pipes discussed herein, whether flexible or rigid, can comprise constant conductance heat pipes (CCHPs) which function in low-gravity environments. Ammonia is employed as the working fluid and aluminum as the outer casing material, however other heat pipe working fluids and casing materials could be used to achieve different temperature ranges. Embedded heat pipes in the panels can use FM73U, a thin unsupported film adhesive, to produce a high thermal conductance joint with a design value of 2.6 W/in$^2$-C. Flanges associated with heat pipes can have a thickness 0.060" and are employed to increase the contact area in high thermal flux locations. Some sections of the heat pipes can have flanges and other sections lack flanges. Heat pipes can be formed by extrusion to have full-length flanges, sections of which are machined away to reduce weight where not needed for thermal conductance. The attachment of heat pipes 671 to side panels 140 and 150 as well as the attachment of cross-strap heat pipes members 652 to main panel 160 can employ TC38 adhesive which is injected into the joint to achieve a high thermal conductance interface with a design value of 3.0 W/in$^2$-C. Heat pipes 661 in main panel 160 can have an outer diameter of 0.58 inches with an internal fin geometry which supports a 4.4 W/in-C vapor-to-casing conductance, low liquid blockage, and a capillary transport capability of 14,500 W-in at 0° C. in this configuration. Flexible heat pipe 674 has a 0.60" outer diameter with a wick structure that supports a 4.1 W/in-C vapor-to-casing conductance and capillary transport capability of 23,000 W-in at 0° C. in this configuration. Heat pipe bore sizes can be increased or decreased to provide different heat transport capability or conductance.

In some examples, the embedded heat pipes of main panel 160 can employ a dual-bore heat pipe or side-to-side bonded heat pipes for redundancy. Variable conductance heat pipes (VCHPs) can replace the CCHPs in either main panel 160 or the flexible sections in the radiator panels. CCHPs have a relatively fixed heat conduction capability. VCHPs can include a reservoir of a fluid which is selectively heated to change heat conductance properties of the working fluid(s) and associated heat pipe. Use of VCHPs would allow for thermal control over a narrow temperature range with much less heater power. Loop heat pipes (LHPs) could be used for the radiator panels with LHP evaporators on the side panels. LHPs can reduce the number of connections across the radiator panels hinge line (145, 155).

FIG. 7 illustrates detailed views 700 and 701 of the heat pipes that are included in an earth-facing panel, such as main panel 160 in FIG. 1. View 700 shows an earth-facing isometric view, and view 701 shows a downward-facing isometric view of a rotated assembly. Assembly 710 includes panel 760 which has parallel heat pipes 711 embedded therein. Panel 760 also has ESAs 714-715 and cross-strap elements 761. Assembly 710 can be coupled to further elements, such as side panels and radiator panels, RF/electrical components, sensors, propulsion/attitude control elements, and other various elements to form a satellite or bus, and thus assembly 710 comprises a subassembly in that regard. Heat pipes 711 extend beyond the perimeter of panel 760 and form right-angle bends 741 and 751 and terminate in flanged sections 742 and 752. An interface with further heat pipes can be formed at the flanged sections by thermally coupling the flanged sections to flanged sections of the further heat pipes. Thus, elements 740 and 750 in FIG. 7 indicate thermal interfaces to additional heat pipe assemblies.

During a manufacturing process, assembly 710 can be formed having heat pipes 711, ESAs 714-715, and cross-strap elements 761 and tested independently of other systems and panel assemblies. Moreover, assembly 710 can be tested with the earth-facing side either vertically or horizontally oriented with respect to the ground by placing the heat pipes "in plane" or in a "reflux" mode. FIG. 7 shows view 701 having the heat pipes embedded in the earth-facing panel horizontal, and for ground testing the ESA temperature is controlled with a cooling plate that either replaces the cross-strap heat pipes or is bonded on top of them. When incorporated into a satellite having radiator panels, these radiator panels are either stowed or not required to function for system testing. Advantageously, this configuration allows for testing of assembly 710 as a subassembly separate from other satellite components to ensure thermal transport rates are within desired ranges and that ESAs 714-715 can be regulated to target temperatures. Adjustments, repairs, rework, or rejection of assembly 710 can occur before final assembly into a satellite bus. Testing in the assembly 710 configuration at the fully built-up system level allows for the north and south panels to be in-plane and thus allows for large design flexibility in their heat pipe network designs.

Figure 8:
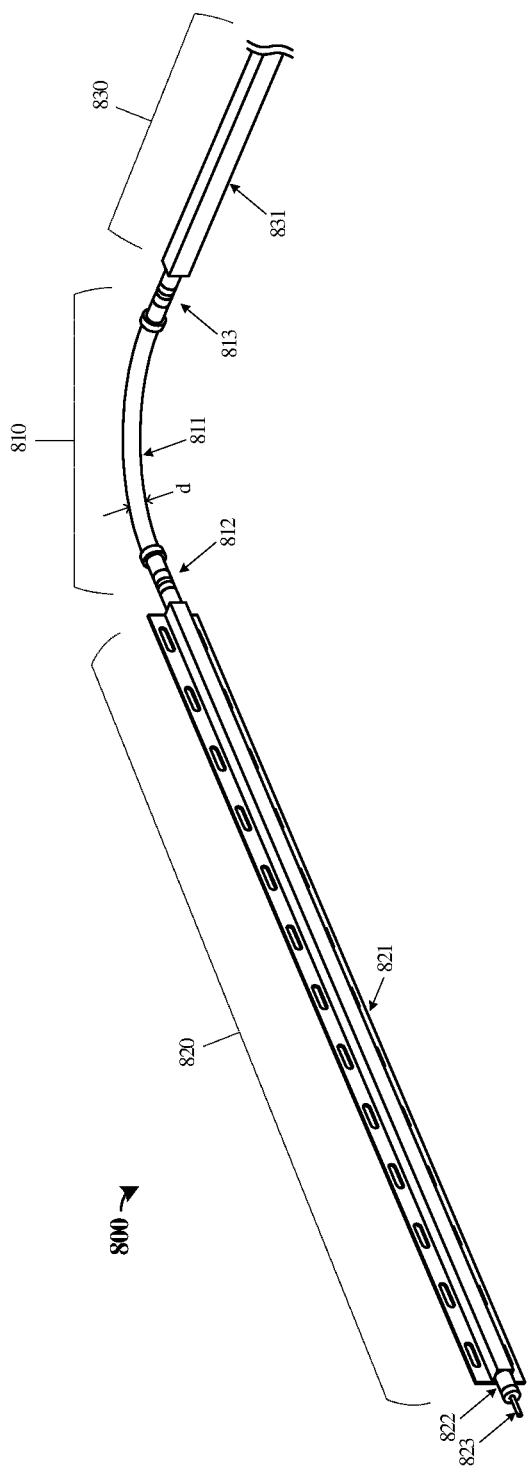
FIG. 8 illustrates a radiator panel flexible heat pipe implementation.

FIG. 8 shows an example flexible heat pipe assembly 800. Portions of assembly 800 may comprise rigid sections, while other portions are flexible sections. Specifically, section 810 comprises a flexible section, and sections 820 and 830 comprise rigid sections, although variations are possible. The rigid sections can share characteristics with other rigid heat pipes employed herein, such as flanges, body members, internal conduits, and the like. Flexible section 810 permits flexing, bending, or rotation between sections 820 and 830.

Flexible section 810 comprises a CCHP with a 0.60 inch outer diameter (d), and includes an internal wick structure that supports a 4.1 W/in-C vapor-to-casing conductance and capillary transport capability of 23,000 W-in at 0° C. As with rigid heat pipes, flexible section 810 comprises an evaporator portion and a condenser portion. However, flexible section 810 includes at least one flexible portion with a separator plate held in place within the flexible tube such that a partitioning is established between a gas-phase passage and a liquid-phase artery. The separator plate and flexible tube are configured such that the flexible portion is flexible in a plane that is perpendicular to the separator plate. This arrangement can provide for flexible section 810 to bend over a particular bend/sweep range within a given movement plane. Flexible section 810 can transport thermal energy through the heat pipe across a range of flex angles. When radiator panels are employed in a satellite, flexible section 810 provides for rotation of the radiator panels out of a stowed configuration into a deployed configuration.

Rigid sections 820 and 830 are coupled to flexible section 810 using couplers 812 and 813. Section 820 further comprises flange 821 which can be used to couple thermal energy to other heat pipes to receive thermal energy from electrical/RF components. Internal coaxial components 822-823 are shown for section 820, which can comprise passages for liquid-phase and gas-phase working fluid. Similar internal features can be included in any of the rigid heat pipes discussed herein. Section 830 includes body member 830 which houses an internal conduit that forms the section of heat pipe.

Figure 9:
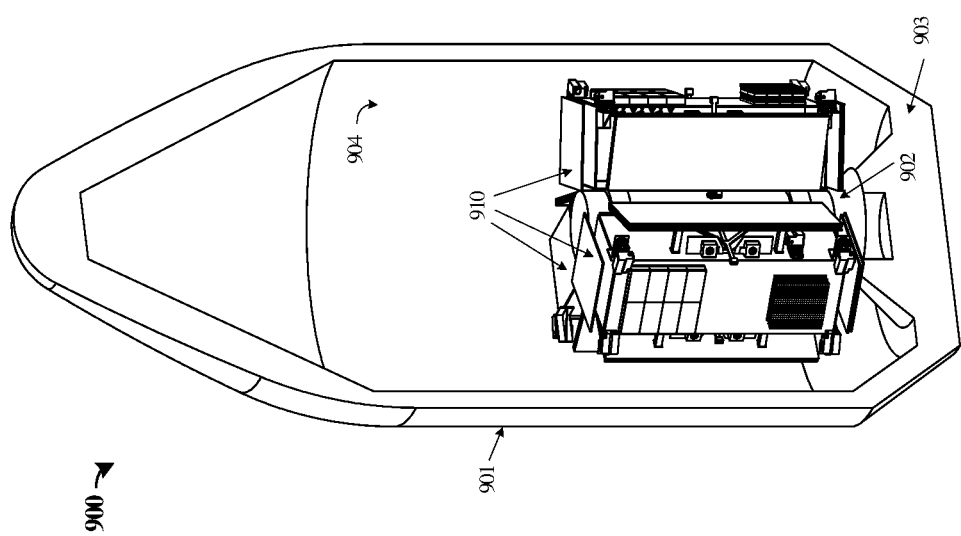
FIG. 9 illustrates satellites packaged within a launch vehicle fairing in an implementation.

FIG. 9 illustrates configuration 900 having satellites 910 packaged within launch vehicle fairing 901. Three satellites are mounted to a central hub structure, namely cylindrical dispenser 902, which holds the satellites during launch until deployment away from the launch vehicle. Cylindrical dispenser 902 is mounted to interface element 903 which couples to both fairing 901 and further portions of the launch vehicle. Although a single stack of three satellites is shown, a second stack or more can be included about a longer version of cylindrical dispenser 902, depending upon the vertical height of fairing 901 and the allowable payload volume 904.

The satellite designs discussed herein with deployable radiators, flexible heat pipes, and modular panels facilitate launch of many spacecraft within a shared fairing. Deployable radiators reduce the stowed volume per-device, and the enhanced thermal control systems discussed herein can reduce device mass as compared to spacecraft having similar heat dissipations. In one example implementation, the earth-facing main panel (e.g. panel 160) is about 128 inches in length and 47 inches in height, and side panels (e.g. panels 140 and 150) are about 47×45 inches. The dimensions of deployable radiator panels (e.g. 141-142 and 151-152) approximately match the dimensions of the side panels. The aspect ratio of satellite 910 is therefore about 0.37 (ratio of shortest to longest side). This form factor increases the earth-facing mounting area available for the ESAs, yet enables the spacecraft to fit between cylindrical dispenser 902 having a diameter 1194 mm and a standard 5-meter fairing which is suitable for payload on a Space Explorations Technologies Corp. (SpaceX) Falcon fairing or a United Launch Alliance Vulcan launch vehicle fairing. With this arrangement and dimensions, three, four, or more spacecraft can be packaged for launch in a 5-$m$ fairing. A further advantage is that the deployable radiators allow a reduction in spacecraft length that lowers the center-of-mass of the spacecraft/dispenser multi-launch stack. This reduces the dispenser mass and increases the launch payload mass fraction.

Figure 10:
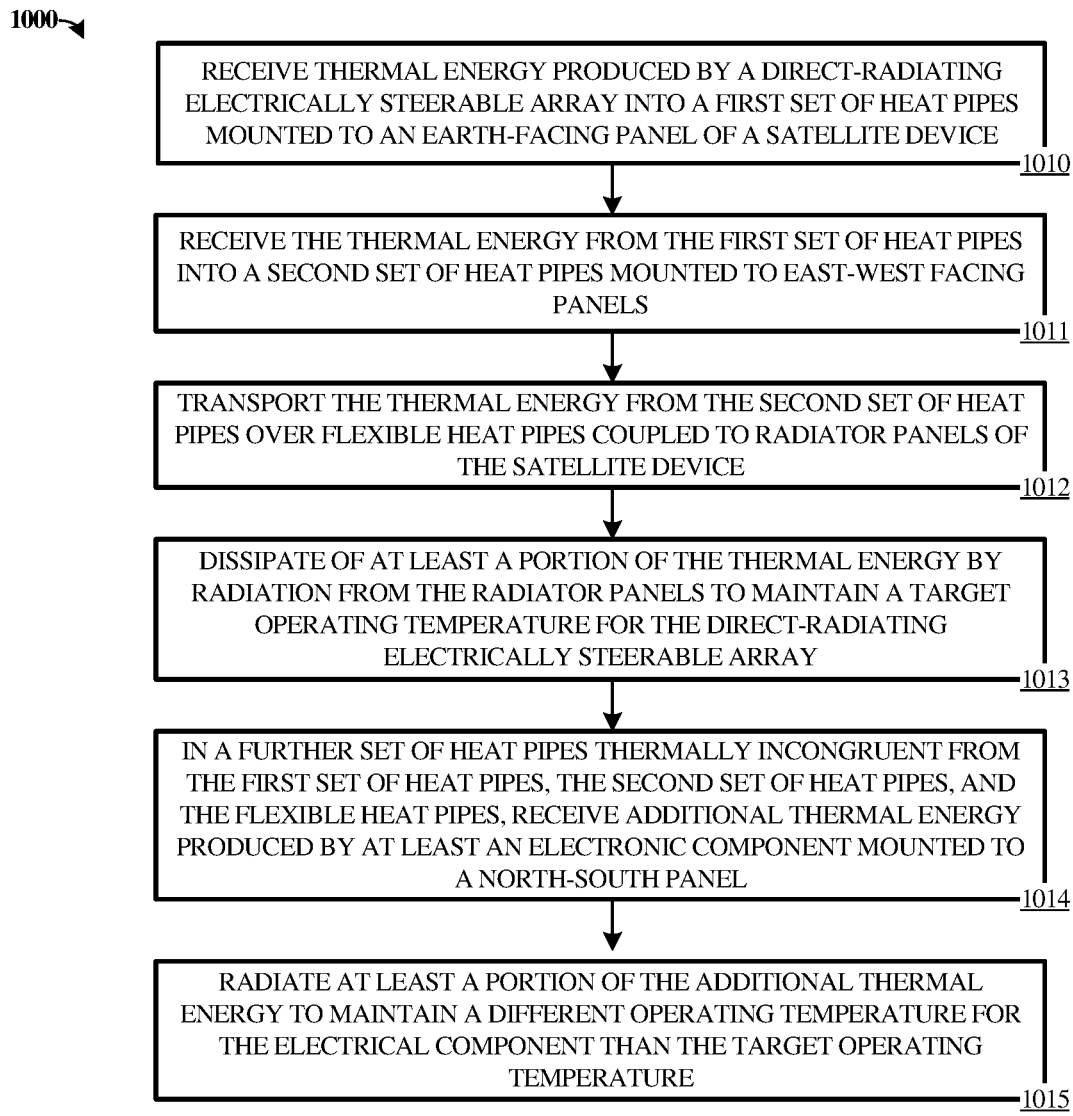
FIG. 10 illustrates a method of operating a thermal control system of a satellite in an implementation.

FIG. 10 is now presented which includes a method of operation of a thermal control system, such as those discussed above. For context, the elements of FIGS. 1-6 will be discussed in the operations of FIG. 10. However, the operations can apply to other systems and components discussed herein.

In operation 1010, thermal energy is received into a first set of heat pipes 162 mounted to earth-facing panel 160 of satellite 110. The thermal energy is produced by operation of at least one component on panel 160 having a thermal or power dissipation property. Example components include a direct-radiating electrically steerable array 114 or 115. This thermal energy, or a portion thereof, is then received (operation 1011) from the first set of heat pipes 162 into a second set of heat pipes 145 and 155 mounted to east-west facing side panels 140 and 150. The thermal energy is transported (operation 1012) from the second set of heat pipes 145 and 155 over flexible heat pipes coupled to radiator panels 141-142 and 151-152 of satellite 110. These radiator panels then dissipate (operation 1013) of at least a portion of the thermal energy by radiation from the radiator panels. Operations 1010-1013 are performed by a first thermal network comprising a first group of heat pipes that maintain a target operating temperature for the direct-radiating electrically steerable array.

A second group of heat pipes 511 thermally incongruent from the first group of heat pipes, receives (operation 1014) additional thermal energy produced by at least an electronic component mounted to a north-south panel 510. Second group of heat pipes 511 then radiate (1015) at least a portion of the additional thermal energy to maintain a different operating temperature for the electrical component than the target operating temperature of the direct-radiating electrically steerable array.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A satellite, comprising:
   a first assembly comprising a main panel with a component having a power dissipation and configured to function in an earth-facing arrangement with respect to an orbit having at least a diurnal temperature attribute from solar illumination, side panels generally perpendicular to the main panel in east facing and west facing configurations facing parallel to an equatorial plane, and radiator panels rotatably deployable outward from the side panels into north facing and south facing configurations perpendicular to faces of the main panel and of the side panels;
   a thermal network configured to regulate the component to a target temperature, and comprising first heat pipes at least partially embedded in the main panel configured to accept thermal energy from the component and transport the thermal energy to the side panels for further transport to the radiator panels and subsequent radiation by the radiator panels in a direction perpendicular to the faces of the main panel and of the side panels; and
   a second assembly thermally incongruent from the first assembly and comprising a non-earth-facing panel with respect to the orbit and having a thermal network having second heat pipes configured to regulate a temperature of at least one additional component to a different target temperature than the component of the first assembly.

2. The satellite of claim 1, the thermal network comprising:
rigid portions of the heat pipes at least partially embedded in the main panel coupled to bend elements that connect to additional heat pipes at least partially embedded in the side panels;
the additional heat pipes coupled to flexible heat pipes that connect to heat pipes at least partially embedded in the radiator panels and thermally coupled to surfaces of the radiator panels;
wherein the flexible heat pipes comprise rotatably compliant structures that accommodate stowage and deployment of the radiator panels with respect to the side panels.

3. The satellite of claim 2, wherein the flexible heat pipes comprise a flexible outer shell and an internal wick structure configured to transport the thermal energy as carried by an internal fluid through a range of flex angles.

4. The satellite of claim 2, wherein the heat pipes, the bend elements, the additional heat pipes, the flexible heat pipes, and the heat pipes of the radiator panels each comprise constant conductance heat pipes (CCHPs) or variable conductance heat pipes (VCHPs).

5. The satellite of claim 2, comprising:
a deployment system configured to rotatably deploy the radiator panels away from the side panels in a stowed configuration to a deployed configuration approximately orthogonal to the side panels, wherein the flexible heat pipes accommodate the rotatable deployment while maintaining connection to the additional heat pipes of the side panels.

6. The satellite of claim 1, wherein the radiator panels, when deployed, correspond to an angular range approximately orthogonal to the side panels and the main panel.

7. The satellite of claim 1, wherein the component comprises a direct-radiating electronically steerable array configured to emit or receive radio frequency energy without earth-facing radio frequency reflector elements.

8. The satellite of claim 1, wherein the second assembly comprises fixed panels facing perpendicular to the faces of the main panel and the side panels.

9. The satellite of claim 1, the thermal network comprising:
a cross-strap heat pipe arrangement on the main panel configured to balance thermal gradients across the heat pipes of the main panel.

10. A system, comprising:
a first set of heat pipes corresponding to an earth-facing panel with respect to an orbit of a satellite and configured to accept thermal energy produced by a component having a power dissipation mounted to the earth-facing panel;
a second set of heat pipes corresponding to east facing and west facing side panels of the satellite facing parallel to an equatorial plane and configured to accept the thermal energy from the first set of heat pipes and transfer the thermal energy over a set of flexible heat pipes to thermal radiator panels of the satellite;
wherein the thermal radiator panels are configured to deploy from a stowed configuration into a deployed north-south configuration facing perpendicular to faces of the earth-facing panel and of the side panels and regulate a target operating temperature for the component; and
a third set of heat pipes corresponding to a non-earth-facing panel with respect to the orbit and thermally incongruent from the first set of heat pipes and the second set of heat pipes, and configured to accept further thermal energy produced by an additional component and regulate to a different target temperature for the additional component than the target operating temperature.

11. The system of claim 10, wherein the non-earth-facing panel comprises a north facing or south facing panel facing perpendicular to the faces of the earth-facing panel and the side panels.

12. The system of claim 10, wherein the flexible heat pipes comprise a flexible outer shell and an internal wick structure configured to transport the thermal energy as carried by an internal fluid through a range of flex angles.

13. The system of claim 10, comprising:
the side panels rotatably coupled to the thermal radiator panels and housing the second set of heat pipes.

14. The system of claim 10, wherein the component comprises a direct-radiating electronically steerable array configured to emit or receive radio frequency energy without earth-facing radio frequency reflector elements.

15. The system of claim 10, comprising:
a cross-strap heat pipe arrangement on the earth-facing panel configured to balance thermal gradients across the first set of heat pipes.

* * * * *